May 24, 1927.
W. B. GARDINER
BALL GRINDING MACHINE
Filed Nov. 26, 1923
1,629,864
3 Sheets-Sheet 1
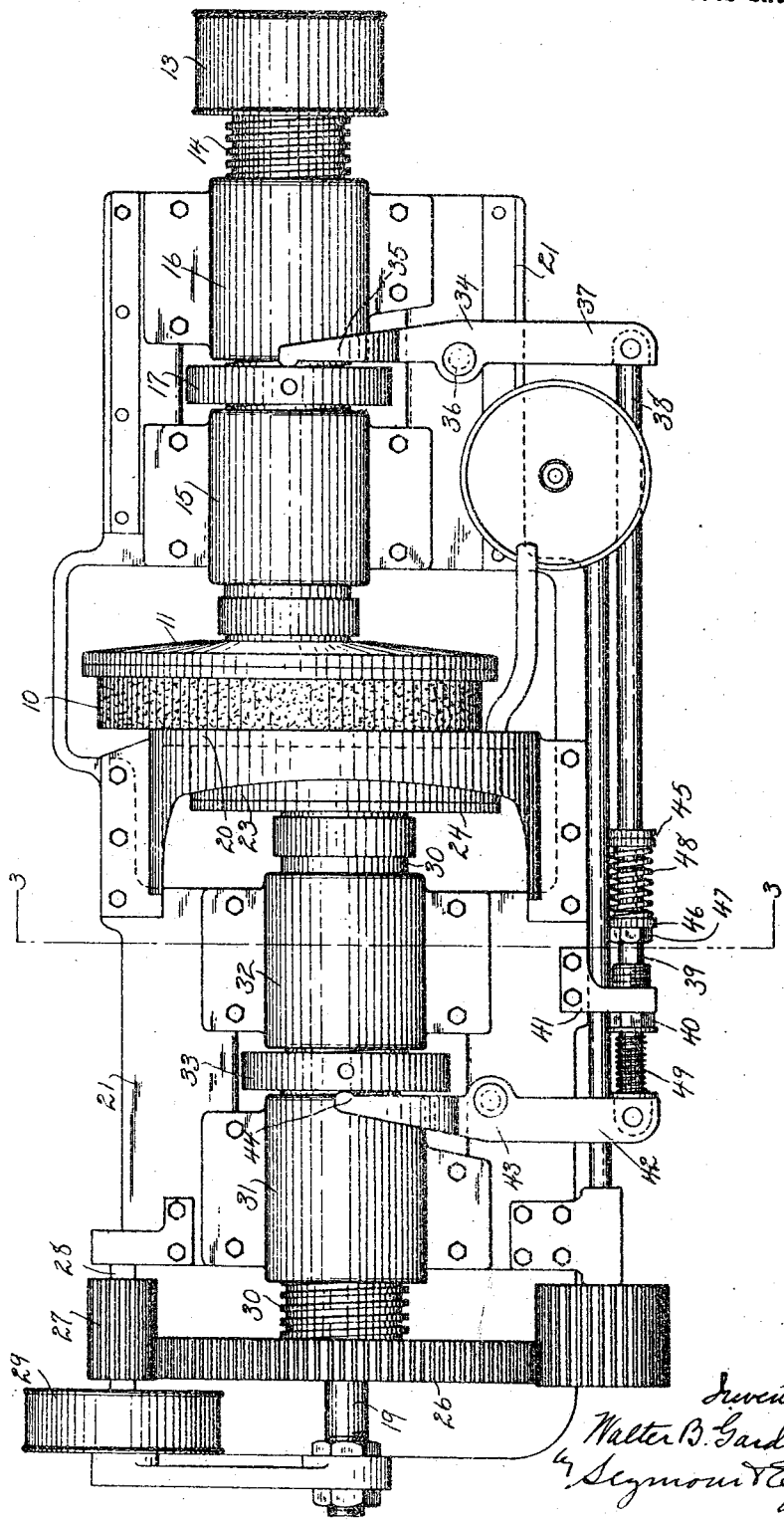

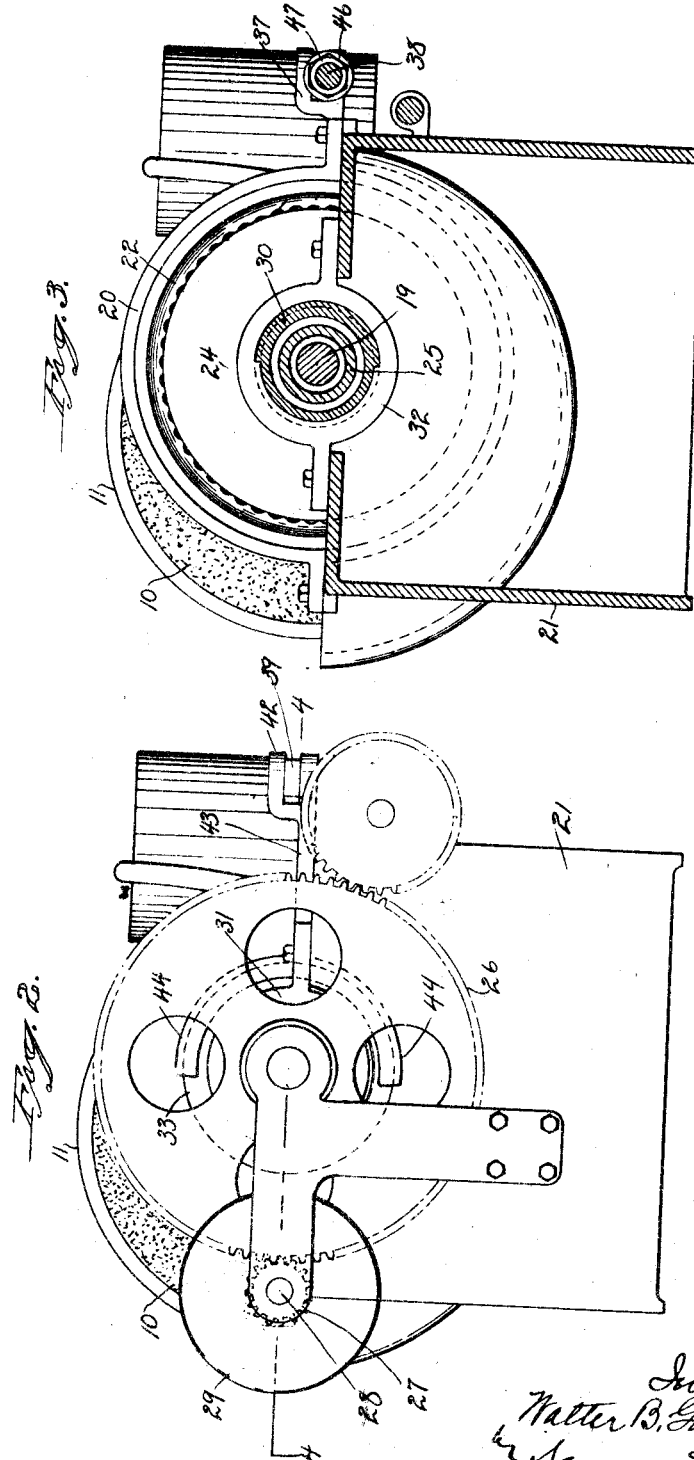

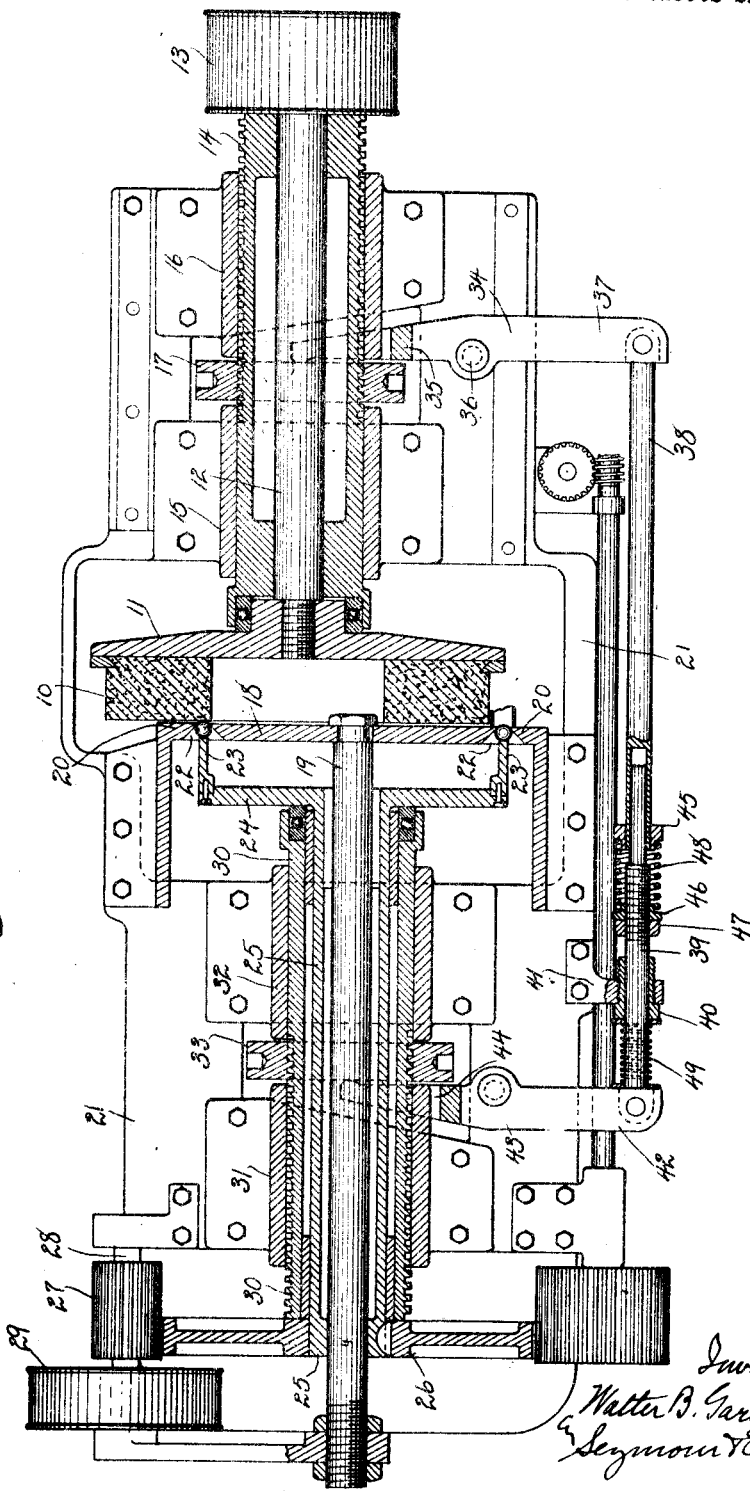

Patented May 24, 1927.

1,629,864

UNITED STATES PATENT OFFICE.

WALTER B. GARDINER, OF HARTFORD, CONNECTICUT.

BALL-GRINDING MACHINE.

Application filed November 26, 1923. Serial No. 676,955.

Fig. 1 is a plan view of a ball-grinding machine illustrating my invention.

Fig. 2 is an end view of the same.

Fig. 3 is a sectional view on the line 3—3 of Fig. 1.

Fig. 4 is a sectional view on the line 4—4 of Fig. 2.

This invention relates to improvement in ball-grinding machines, and particularly to machines which are employed in the first step of preparing balls for finishing. Grinding machines of this character include an abrasive-disk, a drive-ring and a raceway in which the balls are placed and rotated, so as to be acted upon by the abrasive-disk. In such machines a fixed pressure has been applied to the drive-ring to hold the balls against the race-ring. This pressure must be sufficient to hold the balls and overcome the greatest pressure exerted against the balls by the abrasive-disk in the process of grinding. As this latter pressure is variable, subject to the control of the operator, the wear on the race-ring may be unnecessarily increased, for at any time when the pressure of the abrasive disk is less than the maximum, the fixed pressure on the balls between the drive-ring and the raceway becomes more than is necessary to hold and rotate the balls. The object of my invention is to provide an automatic device which will force the abrasive disk against the balls with a constant pressure to its extreme cutting capacity with independent means to regulate the pressure to hold the balls between the drive-ring and raceway, thereby obtaining the maximum grinding action with the minimum wear on the parts, and the invention consists in the construction as hereinafter described and particularly recited in the claims.

In carrying out my invention, I employ an abrasive-disk 10 secured to a metal head 11 carried by a shaft 12 driven by a pulley 13 and journalled in an externally-threaded sleeve 14, this sleeve being supported for longitudinal movement in bearings 15 and 16, and on this sleeve, between the bearings, is an adjusting-nut 17. A V-shaped raceway 22 is formed by a disk 18 secured to a fixed stem 19, eccentric to the shaft 12, and an outer portion 20, which is secured to the frame 21 of the machine. Concentric with the raceway, is a ball-driving-ring 23 fixed to a head 24 at the inner end of a tubular shaft 25, which surrounds the stem 19 and which carries a gear-wheel 26 meshing with a drive-pinion 27 on a shaft 28 driven by a pulley 29. The tubular shaft 25 is concentrically journalled in an externally-screw-threaded sleeve 30 like the sleeve 14, and supported in bearings 31 and 32 and carrying a nut 33 between the bearings, by which the sleeve may be adjusted longitudinally. Pivoted to the frame is a yoke 34, the arms 35 of which straddle the bearing 16, so as to bear against the outer face of the nut 17. This yoke is pivoted at 36 and its end 37 is connected with one member 38 of a telescopic connecting-rod. The other member 39 of the connecting-rod passes through an adjustable collar 40, carried by a bracket 41 secured to the frame, the end of the member 39 being telescopically connected with the end of the member 38. The member 39 is pivotally connected with the arm 42 of a yoke 43, like the yoke 34, and having arms 44 which straddle the bearing 31 and have a bearing against the nut 33. Fixed to the member 38 is a spring-seat 45, and adjustably mounted on the member 39 is a corresponding seat 46, this being adjustably held in place by a nut 47 and between the two seats is a spring 48. On the rod 39, between the collar 40 and the arm 42 of the yoke, is a spring 49, this spring being relatively light, as compared to the spring 48.

The spring 48 applies constant pressure to the members 10 and 23 of equal magnitude, or slightly greater magnitude on the member 23, and in the opposite direction, and the spring 49 adds a small differential of pressure to the member 23, thus causing the pressure of the driving-ring to be constantly greater than that of the grinding-member 10 on the balls which constitute the work, thus assuring that said balls will remain pressed into the raceway.

Balls are fed to and removed from the machine in any approved manner.

In adjusting the machine, the tubular bearing 25 is adjusted so as to bring the drive-ring and abrasive-disk to a proper relative position, so that, when balls are fed between them, they will be properly acted upon. When so adjusted, pressure is applied to sleeves 14 and 30 by the spring 48, which tends to separate the members 38 and 39 of the connecting-rod, between the yokes 34 and 43, so as to force the two sleeves toward each other, and hence the abrasive-wheel and drive-ring. Thus, means are provided for applying grinding pressure to the balls, without decreasing their frictional contact with their raceway. In order that the balls should be rotated and properly presented to the abrasive-wheel, it is necessary that they should be turned in the raceway, and this is accomplished by forcing the driving-ring 23 toward the raceway, so as to keep the balls in engagement with the raceway, and consequently in proper position to be acted upon by the abrasive-wheel, and also to hold them in such contact with the raceway that they will be rotated and avoid the formation of facets on the balls.

The springs may be adjusted to give the desired tension. As before stated, the action of the spring 48 is equal against the sleeves 14 and 30, while the spring 49 only exerts a tension on the drive-ring.

My invention, through the spring 48, gives a constant pressure to the abrasive wheel, keeping it working at its maximum capacity and, at the same time, giving a similar, or slightly greater, equalizing pressure against the drive-ring. By doing this. I overcome or counteract the tendency of the abrasive wheel to press the balls away from the raceway when in action, permitting of a much less pressure against the raceway at any period below the maximum cutting capacity of the abrasive wheel.

If found desirable, I can give an increasing pressure on the drive-ring, as increasing pressure is applied to the abrasive wheel by increasing the length of the lever 43.

This application of pressure on the drive-ring and abrasive-disk simultaneously, as can readily be seen, permits of the minimum pressure needed to control the balls in their raceway, under any or all differences of operation.

I claim:

1. A ball-grinding machine, comprising a fixed raceway providing a slot through which the balls project, an adjustable abrasive disk and an adjustable drive-ring on opposite sides of said raceway, and an equalizing connection between said disk and said ring, whereby adjustment of one toward the other and the raceway will tend to cause a movement of the other toward it and the raceway.

2. A ball-grinding machine, comprising a fixed raceway providing a slot through which the balls project, an adjustable abrasive disk and an adjustable drive-ring on opposite sides of said raceway, and a yieldable equalizing connection between said disk and said ring whereby adjustment of one toward the other and the raceway will tend to cause a movement of the other toward it and the raceway.

3. A ball-grinding machine, comprising a fixed raceway providing a slot through which the balls project, an adjustable abrasive disk and an adjustable drive-ring on opposite sides of said raceway, and a connection between said disk and said ring, whereby adjustment of one toward the other and the raceway will tend to cause a movement of the other toward it and the raceway but producing a preponderating pressure upon the ring.

4. A ball-grinding machine, comprising a raceway and an abrasive-disk, a drive-ring arranged in line with said raceway, eccentric to the said abrasive-disk, the mountings including externally-threaded sleeves, nuts on said sleeves, yokes engaging with said nuts, a two-part connecting-rod between the ends of the yokes, a spring tending to separate the parts of the connecting-rod and hence force the nuts toward each other, and a spring exerting an influence on the drive-ring without affecting the tension on the abrasive-disk.

5. A ball-grinding machine, comprising a grinding-disk, a raceway eccentric to the driving-disk, a drive-ring concentric with the raceway, means for driving the abrasive-disk and drive-ring, externally-threaded tubular bearings for the abrasive-disk and drive-ring, nuts on said bearings by which they may be moved longitudinally, pivotally-mounted yokes bearing against said nuts, the ends of the yokes coupled by a two-part telescopic connecting-rod, stops on each part of the connecting-rod, and a spring between the said stops and adapted to lengthen the connecting-rod, whereby the nuts are forced toward each other, an adjustable bearing on one member of the connecting-rod, and a spring between said bearing and the adjacent yoke, whereby pressure is applied to the drive-ring, independent of the pressure of the spring between the parts of the connecting-rod.

In testimony whereof, I have signed this specification.

WALTER B. GARDINER.